T. D. BURRALL.
Corn Sheller.
No. 4,300. Patented Dec. 6, 1845.
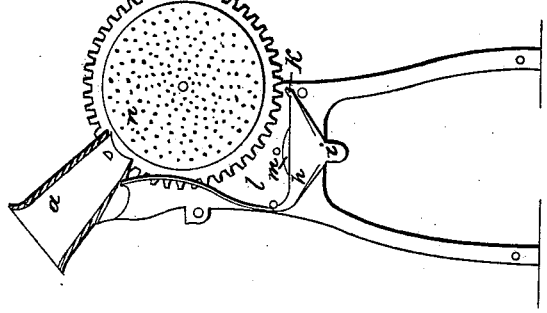
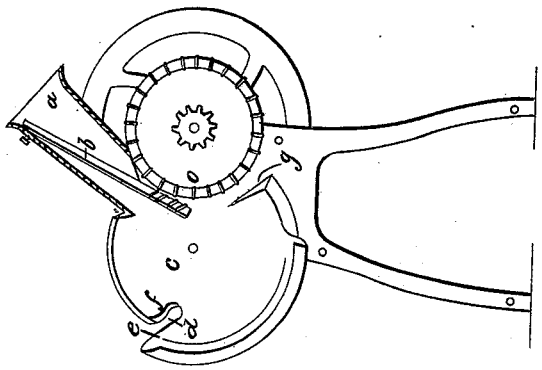
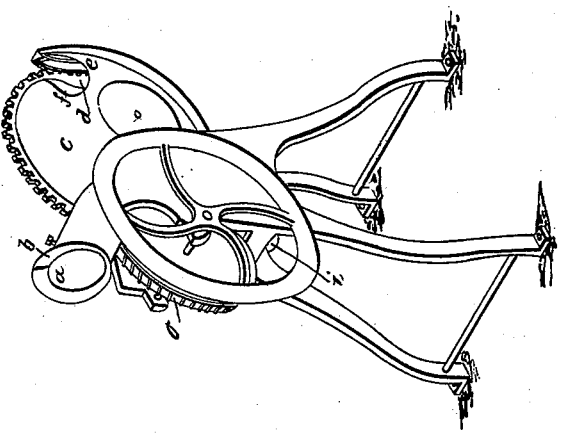
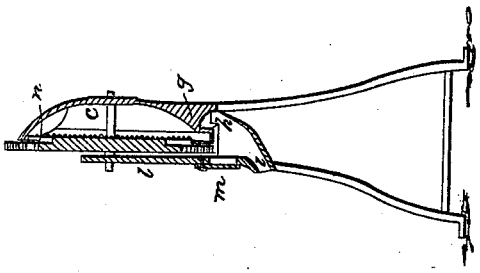

UNITED STATES PATENT OFFICE.

THOMAS D. BURRALL, OF GENEVA, NEW YORK.

CORN-SHELLER.

Specification forming part of Letters Patent No. 4,300, dated December 6, 1845; Reissued October 10, 1865, No. 2,083.

*To all whom it may concern:*

Be it known that I, THOMAS D. BURRALL, of Geneva, in Ontario county and State of New York, have invented a new and useful Improvement in Machines for Shelling Corn, and do hereby declare that the following is a full, clear, and exact description of the same, reference being had to the accompanying drawings, making part of this specification, in which—

Figure 1 is a perspective representation of the machine; Figs. 2 and 3, inside views of the machine divided longitudinally into two parts, the former showing the concave or disk, half the hopper with its spring and the feeder; and the latter, the other half of the hopper, the face of the sheller, the shell and spout, and the valve or door; and Fig. 4, a transverse section.

The same letters are used to indicate like parts in all the drawings.

The corn shellers now in use consist, generally of a suitable frame upon legs of wood or iron, in which is placed upon a horizontal shaft, turned by a crank, a circular face plate, or wheel, of iron, of about sixteen inches diameter, more or less, with pointed teeth, or pyramidal projections, on its face, of about half an inch, more or less, in length. This forms the sheller. Upon the outer edge or rim of this wheel are teeth meshing into, and driving a small pinion on another shaft, on which is placed, at a suitable distance from the face of the sheller, another wheel of about eight inches diameter, having a bevel face inclining to the sheller, across which are raised small oblique ribs, or projecting lines, which serve as a feeder to the sheller, and at the same time to give a rotary motion to the ear of corn as it passes through a spout or hopper above so as to present every part of the surface of the ear to the sheller. Within, or over the hopper is placed a wood or metal spring, so arranged that the lower end of it presses the ear of corn into the corner or angle formed by the sheller and feeder (as they revolve in opposite directions) with sufficient force to enable the teeth to detach the corn from the cob while passing over the feeder. The cob and corn then fall together into a common heap, and are afterward to be separated and cleaned up, by other means. In most of the machines in use, a fly wheel is placed upon the feeder's shaft, so as to give an equable motion to the sheller.

My improvement in the machine above described consists chiefly in adding other parts which serve to separate the corn when shelled from the cob, and pass the corn out by means of a spout on one side of the machine, and the cob, at an opening on the other, without breaking either cob or corn, and without waste or scattering. In order to separate the shelled corn from the cob, and to prevent it from flying out of the machine in the process of shelling, I make use of a cylindrical hopper, ($a$) with a steel spring ($b$) on the inner side, secured by a screw bolt at the upper end, somewhat flattened and enlarged so as to press the ear into the angle formed by the feeder and sheller. Attached to the side of the machine, facing the sheller, I place a section of a circular, cast iron, concave plate or disk ($c$), of the same diameter as the sheller, extending from the lower part of the feeder, forward and upward till it connects with the hopper, the edge of which disk is about half an inch from the ends of the outer row of teeth, while at the center of the same, the space between the disk and ends of the teeth is about two and a half to three inches. On the outer edge of this plate is a circular opening ($d$) about one and a half to two inches diameter, with its lower lip $e$ curved outward and its upper lip ($f$) curved inward, so as nearly to touch the teeth of the sheller. This opening is in the side of the disk opposite to the feeder, and about on a level with the axis of the sheller. Attached to the outer edge of this disk is a cast iron curved spout $g$ about one and a half inches wide, and one and a half to two inches deep extending downward from the opening above described, under the bottom of the disk and sheller, connecting there with a cast iron shell or bottom ($h$) extending across the machine, which forms a continuation of the spout to an opening ($i$) below on one side of the frame, to carry out the shelled corn. The front edge of this shell or bottom is extended upward a short distance as at ($k$), so as to reach near lower edge of the sheller to prevent corn from flying out on that side: from the opposite end of this shell another plate ($l$) is extended across the machine, upward to the hopper, so as to inclose all the back of the machine, leaving only space for the feeder and pinion, in order to keep the corn from flying out behind. The sides of the frame are also inclosed as far down as the shell or bottom, above described, so as entirely to inclose the working part of the machine. On one of these sides and immediately above the lower termination of the spout, is a small door (m) turning on a rivet or pin, for clearing out cobs, or any other obstructions that may get into the machine.

In making my machine I form one half of the hopper in the same piece with the side of the frame, and the other half and also the concave plate or disk, described, with the other half of the frame, thus simplifying, strengthening and economizing in the whole. The way in which the whole works is this: When the corn is shelled from the cob, in passing the working point between the feeder (o) and sheller, (n) they fall together in the space between the lower part of the sheller (n) and disk. Here the cob is again caught and carried forward and upward by the teeth until it reaches the circular opening in the disk, before described, and discharged, while the shelled corn falls through the space between them into the spout below, and passes through the opening on the other side, thus making an entire and perfect separation of the corn from the cob, without loss or trouble. The advantage of the process is obvious, since in the common mode it requires nearly as much labor after the corn is shelled, to separate it from the cob, gather up the corn which is thrown in all directions and fit it for market, as it does to shell it; while in this, none is scattered or broken, or mixed with foreign substances, nor does it require any additional cleaning to fit it for use.

In the machine described I claim—

Making the concave plate or disk with a concave face and circular opening provided with a lower and upper lip for the discharge of the cobs in combination with the sheller and with the shell or bottom, and also, with the door or valve in the side for broken cobs &c., and also, the cylindrical hopper and spring in combination with the feeder, all as herein described.

THOMAS D. BURRALL.

Witnesses:
  GEORGE CLUTE,
  WM. BUTTERFIELD.

[FIRST PRINTED 1913.]